United States Patent
Noda et al.

(10) Patent No.: US 6,824,897 B2
(45) Date of Patent: Nov. 30, 2004

(54) METHOD FOR PRODUCING BONDED ARTICLES, BONDED ARTICLES AND BONDING AGENTS

(75) Inventors: Ken-ichi Noda, Ichinomiya (JP); Tatsuo Kawaguchi, Motosu-Gun (JP)

(73) Assignee: NGK Insulators, Ltd., Nagoya (JP)

( * ) Notice: Subject to any disclaimer, the term of this patent is extended or adjusted under 35 U.S.C. 154(b) by 231 days.

(21) Appl. No.: 10/010,660

(22) Filed: Dec. 6, 2001

(65) Prior Publication Data
US 2002/0069964 A1 Jun. 13, 2002

(30) Foreign Application Priority Data
Dec. 12, 2000 (JP) .......................................... 2000-377114

(51) Int. Cl.[7] .............................. C09J 1/00; C09J 5/06
(52) U.S. Cl. .................... 428/700; 359/831; 156/89.11
(58) Field of Search ............................. 156/89.11, 325; 428/699, 700, 702; 359/831

(56) References Cited

U.S. PATENT DOCUMENTS

| | | | | |
|---|---|---|---|---|
| 3,180,476 A | * | 4/1965 | Patton et al. | 198/399 |
| 3,625,722 A | * | 12/1971 | Freyhold et al. | 106/634 |
| 4,234,557 A | * | 11/1980 | Arendt et al. | 423/594.8 |
| 5,238,518 A | * | 8/1993 | Okubi et al. | 156/326 |
| 5,407,856 A | * | 4/1995 | Quenzer et al. | 438/455 |
| 5,989,372 A | * | 11/1999 | Momoda et al. | 156/89.11 |

FOREIGN PATENT DOCUMENTS

| | | | |
|---|---|---|---|
| EP | 0 567 051 | * | 10/1993 |
| JP | 56-152315 | * | 11/1981 |
| JP | 63-277589 | * | 11/1988 |
| JP | 8-234021 | * | 9/1996 |
| JP | 9-86931 | | 3/1997 |
| WO | 00/16140 | * | 3/2000 |

OTHER PUBLICATIONS

Kazuo Eda et al., "Direct Bonding of Piezoelectric Materials," The Institute of Electronics, Information and Communication Engineers, Technical Report of IEICE, US95–24, EMD 95–20, EPM95–32, Jul. 1995, pp 31–38.

* cited by examiner

Primary Examiner—Melvin C. Mayes
(74) Attorney, Agent, or Firm—Burr & Brown

(57) ABSTRACT

A method for producing a bonded article composed of a first substrate, a second substrate, and a bonding layer through which the first and second substrates are bonded to one another includes the steps of interposing a water-based bonding agent between the first and second substrates, and forming the bonding layer by heating the water-based bonding agent. The water-based bonding agent contains an alkali metal element, and has a water-soluble compound dissolved therein. The water-soluble compound produces a composite oxide by heating.

10 Claims, 1 Drawing Sheet

METHOD FOR PRODUCING BONDED ARTICLES, BONDED ARTICLES AND BONDING AGENTS

BACKGROUND OF THE INVENTION (1) Field of the Invention

The present invention relates to a method for producing bonded articles, bonded articles and bonding agents.

(2) Related Art Statement

As optical bonding agents, organic bonding agents such as epoxy resin or acrylic resin and inorganic bonding agents such as low-melting point glass have been generally known. On the other hand, diffusion bonding, press bonding, optical contacting, etc. have been known as bonding methods using no bonding agents.

In Shin-gaku Giho, "TECHNICAL REPORT OF IEICE US95-24: EMD 95–20: CPM95-32 (1995–07)", pp. 31–38, it is described that a substrate of lithium niobate was directly bonded to another substrate of lithium tantalate, and an optical waveguide structure was made by trial by thinning the lithium niobate substrate. This relates to the direct bonding between the substrates by utilizing molecular forces of hydroxyl groups adsorbed onto the surfaces thereof.

However, when a general bonding agent is used, it is difficult to obtain a bonded article having an extremely thin bonding layer. In case of the diffusion bonding, press bonding, optical contacting, etc. which use no bonding agents, it may be that substrates are not bonded or the bonding strength is low, if fine unevenness exists at bonding surfaces of the substrates to be bonded. On the other hand, a bonding layer can be made thin in a method of forming a thin film of low melting point glass on a surface of at least one of the substrates to be bonded, and contacting and heating the substrate surfaces. However, if fine unevenness exists at the surfaces of the substrates to be bonded, it may be also that they are not bonded together or the bonding strength conspicuously decreases.

SUMMARY OF THE INVENTION

It is an object of the present invention to provide a novel bonding method and a novel bonding agent, which can form a thin bonding layer and can assuredly realize desired bonding strength even if fine unevenness exists at surface(s) of substrates to be bonded.

The present invention relates to the method for producing a bonded article comprising a first substrate, a second substrate, and a bonding layer through which the first and second substrates are bonded. The method includes the steps of interposing a water-based bonding agent between the first and second substrates, and forming the bonding layer by heating the water-based bonding agent. The water-based bonding agent includes an alkali metal element and has a water-soluble compound dissolved therein. The water-soluble compound produces a composite oxide upon heating. Any combination of features recited in the dependent method claims are also considered preferred according to the present invention, unless contrary to the claimed invention.

The present invention also relates to a bonded article obtained using the above method.

The present invention further relates to the water-based bonding agent including an alkali metal element, a water-soluble compound which produces a composite oxide by heating, and water into which the water-soluble compound is dissolved. Any combination of features recited in the dependent bonding agent claims are also considered preferred according to the present invention, unless contrary to the claimed invention.

These and other objects, features and advantages of the invention will be apparent from the following description of the invention when taken in connection with the attached drawings, with the understanding that any modifications, changes and variations could be made by the skilled person in the art to which the invention pertains.

BRIEF DESCRIPTION OF THE DRAWING

For a better understanding of the invention, reference is made to the attached drawing, wherein.

Figure 1:
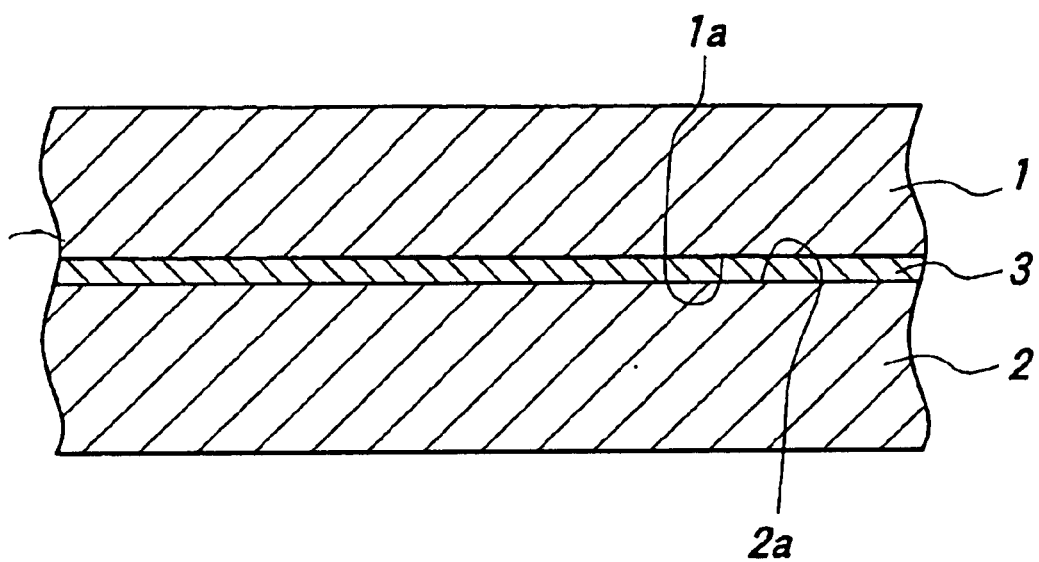
FIG. 1 is a sectional view schematically illustrating a bonded article according to the present invention.

The present invention will be explained with reference to FIG. 1 by way of example. The present inventors contrived a method for interposing the water-based bonding agent containing an alkali metal element and having a water-based bonding agent dissolved therein between a first substrate 1 and a second substrate 2 and forming a bonding layer 3 by heating the water-based bonding agent.

The water-based bonding agent is interposed between a bonding surface 1a of the substrate 1 and a bonding surface 2a of the bonding substrate 2, fills finely uneven portions of each of the bonding surfaces, and forms a film in a gap between the bonding surfaces 1a and 2a. In this state, the bonding agent is heated, thereby producing a bonding layer made of a composite oxide containing an alkali metal element.

The water-based bonding agent may possess no organic group burnable on heating, and no organic solvent needs to be used. Therefore, the generation of a gas or gases from the bonding layer can be suppressed. Such gas or gases cause deterioration and variations in the strength of the bonding layer.

The water-based agent means a bonding agent using water as a principal solvent. At least the above-mentioned water-soluble compound is dissolved in water.

As the alkali metal elements, lithium, potassium and sodium are preferred, and lithium is particularly preferred. A combination of lithium and potassium, that of lithium and potassium and that of lithium, sodium and potassium are similarly preferred.

The water-soluble compound is not limited to any kind, so long as it can produce an oxide after being heated. As such a compound, a carbonate, a nitrate, a sulfate or the like may be recited, by way of example, in addition to a hydroxide. A composite hydroxide containing alkali metal element is further preferred.

The composite hydroxide preferably contains a transition metal element in addition to the alkali metal element, and it more preferably contains metal element(s) in Groups 4 to 7 of the Periodic Table. As such a metal element, niobium and tantalum are preferred.

In a preferred embodiment, the composite hydroxide is selected from the group consisting of niobium-lithium hydroxide, tantalum-lithium hydroxide, niobium-tantalum-lithium hydroxide, niobium-lithium-potassium hydroxide, tantalum-lithium-potassium hydroxide and niobium-tantalum-lithium potassium hydroxide.

Into the water-based bonding agent may be incorporated ceramic fine powder or sol as a filler in addition to the water-soluble compound containing the alkali metal element (s).

The concentration of the water-based compound in the bonding agent is not particularly limited. If the concentration is adjusted to not more than 0.5 mol/liter, it can prevent the bonding layer from being too thick due to an increase in the viscosity of the bonding agent.

A method for interposing the bonding agent between the substrates is not particularly limited. For example, it may be that the bonding agent is applied to a bonding surface of the first substrate, and this bonding surface is contacted to that of the second substrate, followed by heating. At that time, the bonding agent may be applied to the bonding surface of the second substrate. The applying method is not limited, and roll coating, spin coating, dip coating, flow casting, doctor blade, etc. may be recited by way of example.

When the first substrate is contacted with the second substrate at the first and second substrate bonding surfaces, the former may be pressed against the latter in almost vertical directions to the bonding surfaces. Then, the bonding agent may be dried and/or heated while the substrates are pressed against each other in the almost vertical directions, but such pressing may be omitted. The pressure used for such pressing is preferably 0.1 to 0.5 MPa.

The bonding agent may be flown between the first and second substrates, while their bonding surfaces are being opposed to each other. Alternatively, the bonding agent may be drawn into a gap between the bonding surfaces of the first and second substrates, respectively, through a capillary phenomenon.

The bonding agent is preferably dried at a temperature of 60 to 100° C.

The heating temperature depends upon the kind of the bonding agent. When the composite hydroxide selected from the group consisting of niobium-lithium hydroxide, tantalum-lithium hydroxide, niobium-tantalum-lithium hydroxide, niobium-lithium-potassium hydroxide, tantalum-lithium-potassium hydroxide and niobium-tantalum-lithium potassium hydroxide is used, the heating temperature is preferably 200 to 600° C., more preferably not less than 350° C.

The method for producing the water-based bonding agent in which the composite hydroxide is dissolved is not particularly limited.

In a preferred embodiment, a composite alkoxide solution is prepared by refluxing an alkoxide of an alkali metal element and that of another alkali metal element in anhydrous alcohol. Then, decarbonated water is added into the resulting composite alkoxide solution, which is refluxed, thereby hydrolyzing the alkoxide. The composite hydroxide is produced by advancing this hydrolysis almost completely. The composite hydroxide is not soluble in the alcohol, but forms a precipitate. Then, the precipitate is recovered by distilling off the alcohol by heating or filtering it off. The resulting precipitate is dissolved in decarbonated water, thereby producing the water-based bonding agent. JP-A 9-86931 describes details of such a producing method. A preferred metal alkoxide is a metal ethoxide.

When a metal alkoxide is generally hydrolyzed by adding decarbonated water to it, the metal alkoxide tends to be polymerized. However, when the alkoxide of the alkali metal element is hydrolyzed, such polymerization is suppressed on hydrolysis, and the polarity of the composite hydroxide produced by the hydrolysis becomes higher. From this point of view, at least lithium alkoxide is preferably hydrolyzed.

In a preferred embodiment, the composite oxide constituting the bonding layer is selected from the group consisting of lithium niobate, lithium tantalate, lithium niobate-lithium tantalate solid solution, lithium potassium niobate, lithium potassium tantalate and lithium potassium niobate-lithium potassium tantalate solid solution. The bonding layer may be crystalline or amorphous.

In a further preferred embodiment, at least one of the first and second substrates is made from a single crystal. As such a single crystal, a ferrodielectric electro-optic single crystal is particularly preferable. Mention may be made of lithium niobate, lithium tantalate, lithium niobate-lithium tantalate solid solution, lithium potassium niobate, lithium potassium tantalate, lithium potassium niobate-lithium potassium tantalate solid solution, KTP, silicon, GaAs, and quartz. Further, the substrate may be ceramic or glass.

The configuration of the substrate is not particularly limited. For example, the substrate may be a bulky single crystal. Further, a film of a single crystal, a polycrystalline film or an amorphous film may be formed on a surface of the bulk body.

In a still further preferred embodiment, the bonded article of the present invention is an optical member.

In a further preferred embodiment, at least one of the substrates is made of a material identical with or similar to that of the bonding layer produced by heating. The identical material means that constituting components and a fundamental structure are common between them. The ratio of the constituting components may differ between them, and a small amount of additive(s) may exist.

When each of the first and/or second substrates and the bonding layer is made of an electro-optical crystal, at least one metal element selected from the group consisting of magnesium (Mg), zinc (Zn), scandium (Sc) and indium (In) may be incorporated in the crystal. Particularly, magnesium is preferred.

The thickness of the bonding layer is not limited, but it is preferably not more than 0.5 $\mu$m, for example.

In a particularly preferable embodiment, the first substrate is used as a bulk optical waveguide, and the second substrate is used as a substrate for the optical waveguide. In this case, the thickness of the bonding layer is particularly preferably not more than 0.1 $\mu$m.

EXAMPLES

Example 1

In anhydrous ethanol were mixed lithium ethoxide and niobium ethoxide at an equimolecular ratio, and the mixture was refluxed under heating, thereby producing an ethanol solution of lithium niobium composite ethoxide. Decarbonated water was added into the ethanol solution so that the decarbonated water might be 7.5 mol relative to 1 mol of the composite alkoxide, thereby completely hydrolyzing the composite ethoxide. Then, a precipitate of lithium niobium hydroxide was produced by refluxing the mixture. The resulting liquid was heated to 80° C. to remove ethanol, and the recovered precipitate was dissolved in decarbonated water, thereby producing a water-based bonding agent. The molar ratio of lithium and niobium in the water-based bonding agent was 1:1.

X-cut single crystal substrates each made of lithium niobate (15 mm×15 mm) were washed. The water-based bonding agent was applied dropwise on a surface of one of the substrates, and the other was placed upon the one, thereby laminating them together. While the laminated substrates were pressed against each other in almost vertical directions to their bonding surfaces, the bonding agent was preliminarily cured at 100° C. for one hour, and finally cured at 500° C. for 8 hours, thereby obtaining a bonded article.

It was confirmed with an electron microscope that the thickness of the bonding layer was very thin, and not more than 0.1 µm. A sample having a 5 mm-long and 5 mm-wide size was cut out as a compression shearing bonding test piece from the bonded article. This test piece was subjected to the compression shearing bonding test, which revealed that while the lithium niobate single crystal constituting the substrates was destroyed, no fracture occurred at the bonding interface.

Example 2

In anhydrous ethanol were mixed lithium ethoxide, niobium ethoxide and tantalum ethoxide, and the mixture was refluxed under heating, thereby producing an ethanol solution of lithium-niobium-tantalum composite ethoxide. Decarbonated water was added into the ethanol solution so that the decarbonated water might be 7.5 mol relative to 1 mol of the composite alkoxide, thereby completely hydrolyzing the composite ethoxide. Then, a precipitate of lithium niobium tantalum hydroxide was produced by refluxing the mixture. The resulting liquid was heated to 80° C. to remove ethanol, and the recovered precipitate was dissolved in decarbonated water, thereby producing a water-based bonding agent. The molar ratio of lithium, niobium and tantalum in the water-based bonding agent was 1:0.5:0.5.

An X-cut single crystal substrates each made of lithium niobate (15 mm×15 mm) was bonded to a single crystal of lithium tantalate (15 mm×15 mm) cut out in such a crystalline direction as making its coefficient of thermal expansion in conformity with that of the X-cut lithium niobate single crystal substrate. Both the substrates were washed before bonding. The water-based bonding agent was applied dropwise onto a surface of the lithium niobate substrate, and a main plane of the lithium tantalate substrate was placed thereupon, thereby laminating them together. While the laminated substrates were pressed against each other in almost vertical directions to their bonding surfaces, the bonding agent was preliminarily cured at 100° C. for one hour, and finally cured at 500° C. for 8 hours, thereby obtaining a bonded article.

It was confirmed with the electron microscope that the thickness of the bonding layer was very thin, and not more than 0.1 µm. A sample having a 5 mm-long and 5 mm-wide size was cut out as a compression shearing bonding test piece from the bonded article. This test piece was subjected to the compression shearing bonding test, which revealed that while the lithium niobate single crystal or the lithium tantalate single crystal constituting the substrates was destroyed, no fracture occurred at the bonding interface.

As mentioned above, the present invention can provide a novel bonding method and a novel bonding agent, which can form a thin bonding layer and can assuredly realize desired bonding strength even if fine unevenness exists at surface(s) of substrates to be bonded.

What is claimed is:

1. A bonded article, comprising:
   a first substrate;
   a second substrate; and
   a bonding layer interposed between said first and second substrates to bond said first and second substrates to one another, said bonding layer having a thickness of not more than 0.5 µm and comprising a composite oxide comprising at least one alkali metal element and at least one transition metal element, wherein
   a solvent used for the bonding layer consists essentially of an aqueous solvent and at least one of said first substrate and said second substrate comprises a single crystal.

2. The bonded article according to claim 1, wherein said at least one alkali metal element comprises lithium.

3. The bonded article according to claim 2, wherein said composite oxide is selected from the group consisting of lithium niobate, lithium tantalate, lithium niobate-lithium tantalate solid solution, lithium potassium niobate, lithium potassium tantalate and lithium potassium niobate-lithium potassium tantalate solid solution.

4. The bonded article according to claim 2, wherein said single crystal comprises a ferrodielectric electro-optic single crystal.

5. The bonded article according to claim 4, wherein said single crystal comprises at least one selected from the group consisting of lithium niobate, lithium tantalate, lithium niobate-lithium tantalate solid solution, lithium potassium niobate, lithium potassium tantalate, lithium potassium niobate-lithium potassium tantalate solid solution, KTP, glass, silicon, GaAs, and quartz.

6. The bonded article according to claim 2, wherein the bonded article comprises an optical member.

7. The bonded article according to claim 1, wherein said composite oxide is selected from the group consisting of lithium niobate, lithium tantalate, lithium niobate-lithium tantalate solid solution, lithium potassium niobate, lithium potassium tantalate and lithium potassium niobate-lithium potassium tantalate solid solution.

8. The bonded article according to claim 1, wherein said single crystal comprises a ferrodielectric electro-optic single crystal.

9. The bonded article according to claim 8, wherein said single crystal comprises at least one selected from the group consisting of lithium niobate, lithium tantalate, lithium niobate-lithium tantalate solid solution, lithium potassium niobate, lithium potassium tantalate, lithium potassium niobate-lithium potassium tantalate solid solution, KTP, glass, silicon, GaAs, and quartz.

10. The bonded article according claim 1, wherein the bonded article comprises an optical member.

* * * * *